(12) United States Patent
Kim et al.

(10) Patent No.: US 9,298,297 B2
(45) Date of Patent: Mar. 29, 2016

(54) METHOD AND APPARATUS FOR CONTROLLING FLEXIBLE DISPLAY PANEL

(71) Applicant: Samsung Electronics Co. Ltd., Suwon-si, Gyeonggi-do (KR)

(72) Inventors: Kisoo Kim, Suwon-si (KR); Chihun Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 261 days.

(21) Appl. No.: 13/934,832

(22) Filed: Jul. 3, 2013

(65) Prior Publication Data

US 2014/0009419 A1  Jan. 9, 2014

(30) Foreign Application Priority Data

Jul. 3, 2012  (KR) .................. 10-2012-0072020

(51) Int. Cl.
*G06F 3/041*  (2006.01)
(52) U.S. Cl.
CPC ............ *G06F 3/0412* (2013.01); *G06F 3/0416* (2013.01); *G06F 2203/04102* (2013.01)

(58) Field of Classification Search
CPC .................. G06F 1/1652; G06F 2203/04102; H04M 1/0268; G09F 9/301
See application file for complete search history.

(56) References Cited

U.S. PATENT DOCUMENTS

| | | | |
|---|---|---|---|
| 2005/0248501 A1* | 11/2005 | Kim ............................... | 345/1.1 |
| 2006/0146488 A1* | 7/2006 | Kimmel ........................ | 361/681 |
| 2010/0164973 A1* | 7/2010 | Huitema et al. .............. | 345/581 |
| 2013/0234951 A1* | 9/2013 | Kim et al. ..................... | 345/173 |
| 2014/0218375 A1* | 8/2014 | Kim ............................... | 345/501 |

* cited by examiner

*Primary Examiner* — Amare Mengistu
*Assistant Examiner* — Shawna Stepp Jones
(74) *Attorney, Agent, or Firm* — Jefferson IP Law, LLP (57) ABSTRACT

A method for controlling a flexible display panel of an apparatus having an axis of rotation, the flexible display panel having one end which is attached to the axis of rotation, such that the flexible display panel is to be rolled to the axis of rotation and to be unrolled from the axis of rotation is provided. The method includes calculating an amount of rotation of the axis of rotation, calculating an unfolded area of the flexible display panel by using the amount of rotation, and controlling the flexible display panel so as to display image information on the unfolded area.

14 Claims, 6 Drawing Sheets

METHOD AND APPARATUS FOR CONTROLLING FLEXIBLE DISPLAY PANEL

PRIORITY

This application claims the benefit under 35 U.S.C. §119(a) of a Korean patent application filed on Jul. 3, 2012 in the Korean Intellectual Property Office and assigned Serial No. 10-2012-0072020, the entire disclosure of which is hereby incorporated by reference.

BACKGROUND OF THE INVENTION

1. Field of the Invention

The present invention relates to a method and an apparatus for controlling a display panel. More particularly, the present invention relates to a method and an apparatus for controlling to display image information on an unfolded display area of a flexible display panel.

2. Description of the Related Art

As electronic devices have become light and simple, a touch screen having a touch panel and a display panel which are integrally formed with each other has become widely used as the display unit thereof. Recently, a flexible display panel has been featured.

The flexible display panel replaces a glass substrate that surrounds a liquid crystal with a plastic film in a Liquid Crystal Display (LCD) and an Organic Light Emitting Diode (OLED), thereby making it possible to fold and unfold the display panel. The flexible display panel is resistant to impact as well as thin and light. In addition, the flexible display panel may be bent or stooped, and may be shaped in various forms. Further, although the flexible display panel is slim and light, it remains unbreakable even in the case of dropping the panel, thus making it is easy to handle and durable. In addition, the flexible display panel may be formed to have a curved shape, thereby making it possible to expand an application range of the display.

An entire display area of a flexible display panel may be divided into an unfolded area and a folded area. For example, the flexible display panel may be in a state in which the entire display area is rolled around the axis of rotation, a state in which the entire display area is unfolded to unroll from the axis of rotation, or a state in which only a portion of the entire display area is unrolled from the axis of rotation, like a toilet roll. According to the related art, the image information is displayed on the entire display area. As a result, an application efficiency (i.e., the ability to use when only a portion of the entire display area is unrolled) of the flexible display panel is deteriorated. In addition, power remains consumed at the folded area.

Therefore, a need exists for a method and an apparatus to control the display of image information on an unfolded display area of a flexible display panel.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for controlling a flexible display panel capable of displaying image information on an unfolded display area of a flexible display panel.

In accordance with an aspect of the present invention, a method for controlling a flexible display panel of an apparatus having an axis of rotation, the flexible display panel having one end which is attached to the axis of rotation such that the display panel is to be rolled to the axis of rotation and to be unrolled from the axis of rotation, is provided. The method includes calculating an amount of rotation of the axis of rotation, calculating an unfolded area in an entire display area of the flexible display panel by using the amount of rotation, and controlling the flexible display panel so as to display image information on the unfolded area.

In accordance with another aspect of the present invention, an apparatus for controlling a flexible display panel is provided. The apparatus includes an axis of rotation, a flexible display panel having one end which is attached to the axis of rotation to be rolled to the axis of rotation and to be unrolled from the axis of rotation, an angle sensor sensing an angle of the axis of rotation, and a controller for calculating an amount of rotation of the axis of rotation by using angle information received from the angle sensor, for calculating an unfolded area in an entire display area of the flexible display panel by using the amount of rotation, and for controlling the flexible display panel so as to display image information on the unfolded area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An exemplary method and an apparatus of the present invention may be applied to various multimedia devices having a flexible display panel. For example, the multimedia devices may be any of a smart phone, a tablet PC, a notebook PC, a desktop PC, a TV, a navigation apparatus, a video phone, and the like. In addition, the method and the apparatus according to exemplary embodiments of the present invention may be also applied to a device (for example, a refrigerator having both of a communication function and a touch screen) in which the multimedia devices may be integrated.

Hereafter, an exemplary method and apparatus of the present invention is described. If it is determined that the descriptions of well-known functions or constructions related to the present invention may obscure the gist of the present invention, the detailed description thereof will be omitted.

Figure 1:
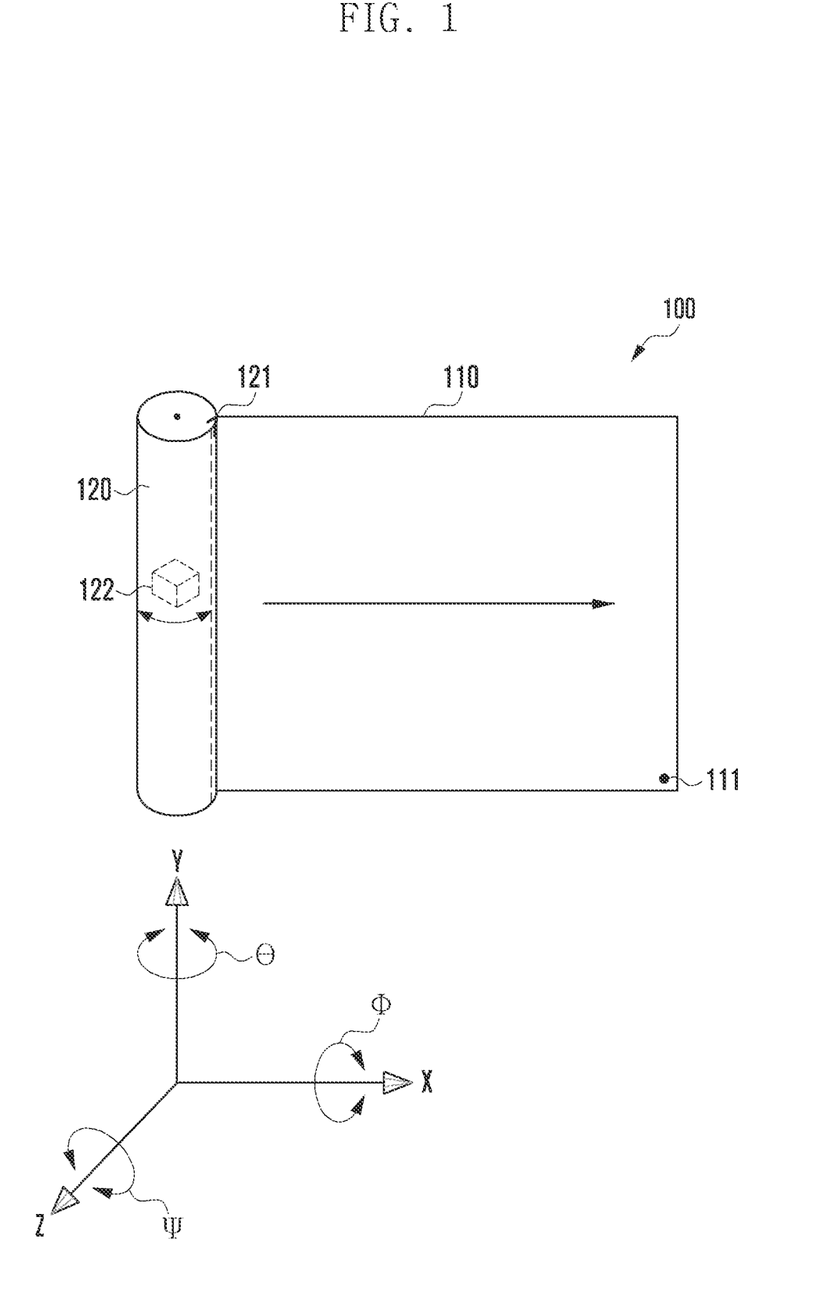
FIG. 1 is a diagram illustrating an external appearance of an apparatus according to an exemplary embodiment of the present invention.

FIG. 1 is a diagram illustrating an external appearance of an apparatus according to an exemplary embodiment of the present invention.

Referring to FIG. 1, an apparatus 100 includes a flexible display panel 110 and a body 120. The flexible display panel 110 may be rolled around the axis of rotation (in a Y axis direction) provided in the body 120 like a toilet paper roll. That is, the flexible display panel 110 has one end attached to the axis of rotation, such that the flexible display panel 110 may be either rolled around the axis of rotation or unrolled from the axis of rotation. The flexible display panel 110 may also have a magnet 111 which may be installed, e.g., at a right lower point thereof, and which may act in concert with a hall sensor installed inside the body 120 (as described below).

The body 120 has a hole 121 to draw the flexible display panel 110 from one side thereof. A user may draw the flexible display panel 110 from the body 120 through the hole 120. That is, the flexible display panel 110 may unroll in a positive X axis direction as shown in FIG. 1. In this case, the axis of rotation of the flexible display panel 110 rotates in a clockwise direction. In addition, the user may put the flexible display panel 110 into the body 120 through the hole 121. In this case, the axis of rotation of the flexible display panel 110 rotates in a counterclockwise direction.

The axis of the rotation of the flexible display panel 110 may include an angle sensor 122 mounted therein. The angle sensor 122 detects angle information (e.g., each acceleration of the X axis, Y axis, and Z axis) of the axis of the rotation to transfer to a controller. Here, the controller may be mounted on a Printed Circuit Board (PCB) in the body 120 and electrically connected to the angle sensor 122. The controller calculates an amount of rotation (that is, an angle at which the axis of rotation rotates) of the axis of rotation using the angle information received from the angle sensor 122 to control the flexible display panel 110 based on the amount of rotation calculated. More particularly, the controller calculates the amount of the Y-axis rotation relating to the degree of unfolding of the flexible display panel 110.

Figure 2:
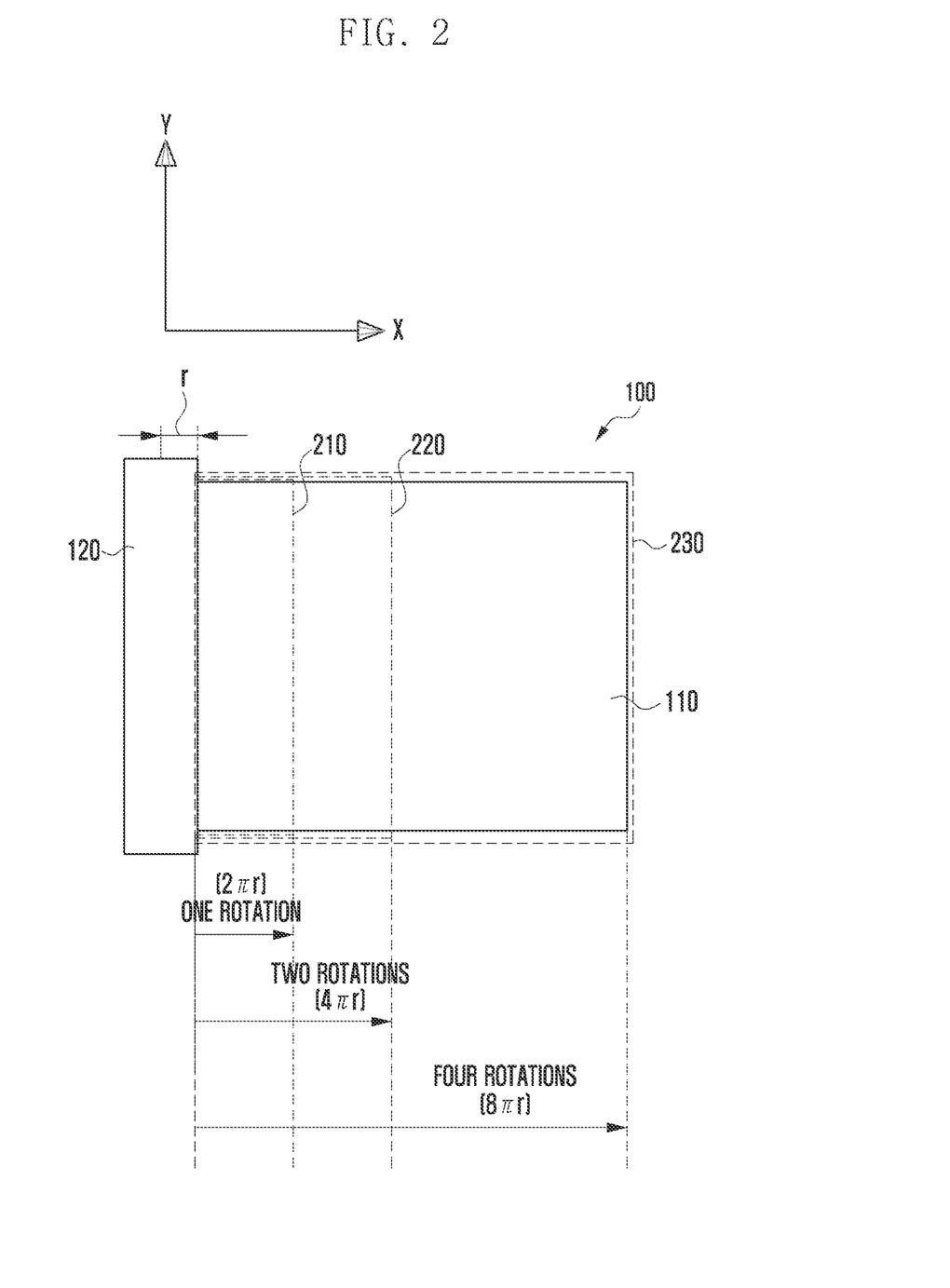
FIGS. 2, 3A and 3B are diagrams illustrating a process of displaying image information according to the degree of unfolding of a flexible display panel according to exemplary embodiments of the present invention.
Figure 3A:
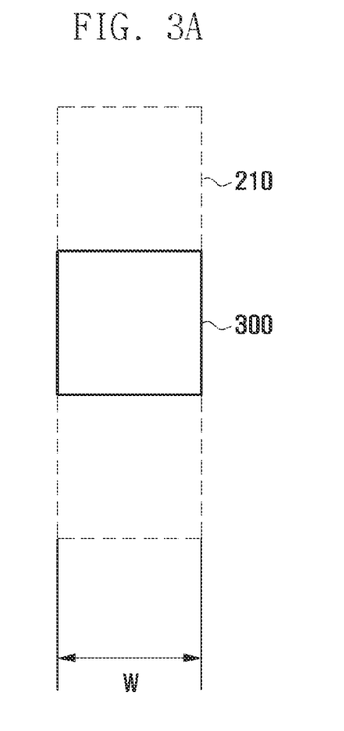
Figure 3B:
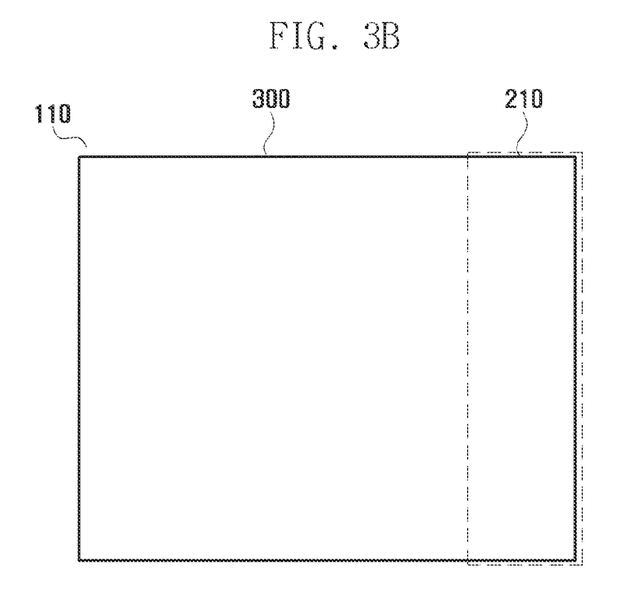

FIGS. 2, 3A and 3B are diagrams illustrating a process of displaying image information on an unfolded area of a flexible display panel according to exemplary embodiments of the present invention.

Referring to FIG. 2, when the angle sensor 122 turns around one time (i.e., 360 degrees), the controller recognizes that the flexible display panel 110 is unrolled in the positive X axis direction by $2\pi r$. Here, the r may be a radius of the axis of rotation of the flexible display panel 110. The controller controls the flexible display panel 110 so that the image information is displayed on a first unfolded area 210 corresponding to the $2\pi r$ in the entire display area. In other words, under the control of the controller, the flexible display panel 110 displays the image information only in the first unfolded area 210 of the entire display area. Similarly, when the angle sensor 122 turns around two times (i.e., 720 degrees) or four times (i.e., 1440 degrees), the controller may recognize that the flexible display panel 110 is unrolled in the positive X axis direction by $4\pi r$ or $8\pi r$, respectively. In such case, the controller may control the flexible display panel 110 so that the image information is displayed on a second unfolded area 220 corresponding to a $4\pi r$ rotation, or to a third unfolded area 230 corresponding to an $8\pi r$ rotation, as appropriate.

Referring to FIGS. 3A and 3B, it is assumed that a picture 300 is initially set to display on the entire display area. The flexible display panel 110 may however also display the picture 300 to reduce a size of the picture 300 according to a width W of the first unfolded area 210, as shown in FIG. 3A. In addition, the flexible display panel 110 may display only a portion corresponding to the first unfolded area 210 in the picture 300, as shown in FIG. 3B. As mentioned in connection with FIG. 2, a second unfolded area 220 may be an unfolded area when the angle sensor 122 turns round two times, and a third unfolded area 230 may be an unfolded area when the angle sensor 122 turns round four times.

Figure 4:
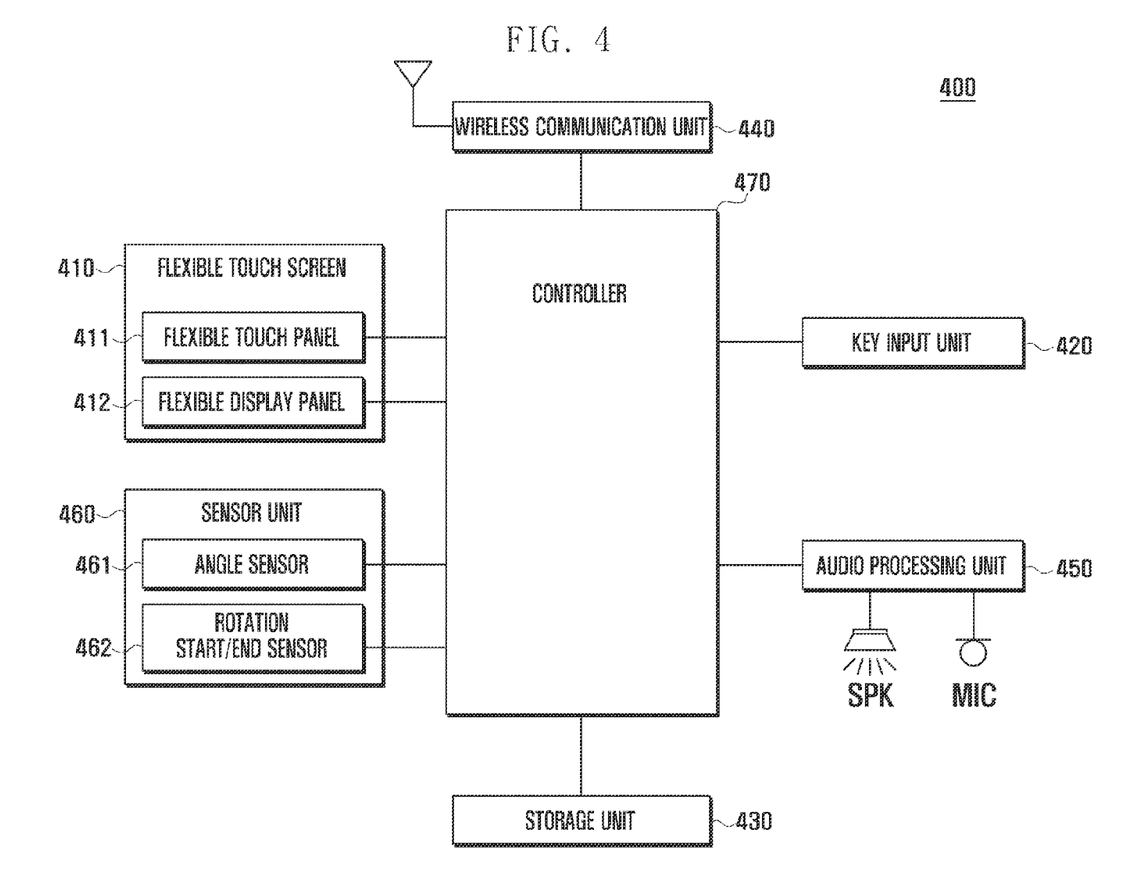
FIG. 4 is a block diagram of an apparatus according to an exemplary embodiment of the present invention.

FIG. 4 is a block diagram of an apparatus according to an exemplary embodiment of the present invention.

Referring to FIG. 4, the apparatus 400 may be configured to include a flexible touch screen 410, a key input unit 420, a storage unit 430, a wireless communication unit 440, an audio processing unit 450, a speaker (SPK), a microphone (MIC), a sensor unit 460, and a controller 470.

The flexible touch screen 410 (hereinafter, referred to as 'touch screen') may be configured to include a flexible touch panel 411 (hereinafter, referred to as 'touch panel') and a flexible display panel 412 (hereinafter, referred to as 'display panel') in order to provide a user interface for interaction with the user. The touch panel 411, which may be a flexible film type, may be placed on the display panel 412. More specifically, the touch panel 411 may be implemented as an add-on type positioned on the display panel 412, an in-cell type or an on-cell type inserted in the display panel 412.

The touch panel 411 serves to generate an analog signal (for example, a touch event) in response to the user's gestures in connection with the touch panel 411, and to perform an Analog-Digital (A/D) conversion of the analog signal to transfer to controller 470. The controller 470 detects the user's gestures from the transferred touch event. That is, the controller 470 may detect any of a touch point, a touch moving distance, a touch moving direction, a touch speed, a touch pressure, and the like, to control the configurations. The user's gestures are mainly divided into a touch and a touch gesture. The touch gestures may include, e.g., a tap, a double tap, a long tap, a drag, a drag & drop, a flick, a press, and the like. Here, a touch means a user contact by, for example, using a touch input means (for example, a finger or a stylus pen) on any one point of the screen; a tap means, for example, to touch-off the touch input means from the corresponding point without moving of the touch input means after touching any one point thereof; a double tap means, for example, tapping twice any one point; a long tap means, for example, an operation to touch-off the touch input means from the corresponding point without moving of the touch input means after touching relatively longer than the tap; a drag means, for example, to move the touch input means in a predetermined direction while touching any one point, a drag-and-drop means, for example, an operation to drag and touch-off the touch input means; a flick means, for example, that the touch input means is rapidly moved like a flip as compared with the drag and is then touched off; and a press means, for example that the user touches any one point and presses a corresponding point using the touch input means. That is, the touch means a state of contacting with the touch screen, and the touch gesture means a motion of touch from touch-on to touch-off the touch screen. The touch panel 411 includes a pressure sensor to sense the pressure of the touched point. The sensed pressure information is transferred to the controller 470, and the controller 470 may classify the touch and the press based on the sensed pressured information. In the touch panel 411, a resistive type, a capacitive type, an electromagnetic induction type, and the like may be applied.

Under the control of the controller 470, the display panel 412 converts the image data received from the controller 470 into the analog signal to display thereon. That is, the display panel 412 may display various screens, for example, a lock screen, a home screen, an application ('app') execution screen, a keypad screen, and the like, according to the use of the apparatus 400. The lock screen may be defined as the image displayed on the display panel 412 when the display panel 412 is turned on. When the touch gesture for unlocking is detected, the controller 470 may change the image displayed on the display panel from the lock screen to the home screen, or the app execution screen. The home screen may be defined as the image including a plurality of app icons corresponding to a plurality of apps, respectively. When one of the plurality of app icons is selected (for example, taps the icon) by the user, the controller 470 may execute a corresponding app (for example, video player), and display the execution screen on the display panel 412.

The key input unit 420 may include a plurality of input keys and function keys for receiving number or character information and setting various functions. The key input unit 420 may generate a key event (for example, display on/off event) associated with the user setting and the function control of the apparatus 400 to transfer to the controller 470. The controller 470 may control the above configurations in response to the key event.

The storage unit 430 may store image information, for example, an image, a document, a video, a message, e-mail, music, and the like, as may be generated in the apparatus 400 or downloaded from an outside source according to the use of the apparatus 400. Further, the storage unit 430 may store the screens displayed on the touch screen 410. In addition, the storage unit 430 may store various setting values (for example, brightness, vibration in touching, and automatic rotation of screen) for the management of the portable terminal. The storage unit 430 may store various programs. More specifically, the storage unit 430 may store an Operating System (OS), a codec, an embedded application, and a 3rd party application for booting and operating of the above configurations.

The wireless communication unit 440 serves to control a voice calls, a video calls, or data communication under the control of the controller 470. To this end, the wireless communication unit 440 may include a wireless frequency transmitter for controlling an up-conversion and amplification of a frequency of the transmitted signal and a wireless frequency receiver for controlling a low noise amplification and down-conversion of a frequency of the received signal. In addition, the wireless communication unit 440 may include a mobile communication module (e.g., a 3-generation mobile communication module, a 3.5-generation mobile communication module, or a 4-generation mobile communication module), a Digital Multimedia Broadcast Module (e.g., DMB module), and a near field communication module (e.g., a Wi-Fi module, a Bluetooth module), etc.

The audio processing unit 450 is coupled to the speaker (SPK) and the mike (MIC) to thereby perform an input and output functions of an audio signal for a speech recognition function, a speech duplication function, a digital recording function, and a telephone call function. That is, the audio processing unit 450 performs the functions for outputting the audio signal through the speaker (SPK) and for receiving the audio signal through the mike (MIC). The audio processing unit 450 receives the audio data from the controller 470 to D/A convert the received audio data into the analog signal and outputs the analog signal through the speaker (SPK). The audio processing unit 450 receives the analog signal through the MIC to A/D convert the received analog signal into the audio data and provides the audio data to controller 470. The SPK converts and outputs the analog signal received from the audio processing unit 450 into sound wave. The MIC converts the sound wave transferred from a person or other sound source into the analog signal.

The sensor unit 460 detects at least one of various state changes such as a slope change, an illumination change, an acceleration change, and the like to transfer to the controller 470. The sensor unit 460 may be made of various sensors. Here, under the control of the controller 470, power is supplied to the sensors, so that the state change of the apparatus 400 can be detected. In the sensor unit 460, the sensors may be integrally formed in one chip or the sensors may be implemented by separated chips. More particularly, the sensor unit 460 is configured to include the angle sensor 461 and a rotation start/end sensor 462.

The angle sensor 461 detects the angle information of the axis of rotation of the flexible display panel 412 to transfer to the controller 470. More specifically, the angle sensor 461 may be configured to include the acceleration sensor. The acceleration sensor may measure the acceleration for each of X axis, Y axis, and Z axis components shown in FIG. 1. In addition, the acceleration sensor may include a gyro sensor. Therefore, in a case in which motion information of the apparatus 400 cannot be obtained, gravity acceleration may be measured. As an example, in the case in which the display panel 110 is disposed upwardly (in a positive Z axis direction) on XY plane as shown in FIG. 1, in the gravity acceleration measured by the sensor unit 460, the X axis and Y axis components may be 0 m/sec2, and the Z axis component may be +9.8 m/sec2. In the case in which the display panel 110 is upset, the X axis and Y axis components may be 0 m/sec2, and the Z axis component may be −9.8 m/sec2. In a case in which motion information of the apparatus 400 may be obtained, the acceleration sensor may detect an acceleration which is obtained by adding the motion acceleration to the gravity acceleration of the apparatus 400. For example, referring to FIG. 1, in a case in which the user draws the flexible display panel 110 from the body 120, the axis of rotation of the flexible display panel 110 rotates. Therefore, the acceleration of the X axis component is changed. Thus, the sensor unit 460 may detect each of the accelerations for the X axis, the Y axis, and the Z axis directions in a coordinate system. In this case, each axes and the gravity acceleration corresponding to the axes may be changed according to an installation position of the sensor unit 460.

The rotation start/end sensor 462 detects the rotation start event or the rotation end event. For example, the rotation start/end sensor 462 is configured to include a magnet and a hall sensor detecting a magnetic field. Referring to FIG. 1, the magnet 111 may be installed at a right lower point of the display panel 110 and the hall sensor may be installed inside the body 120. That is, the magnet 111 may become a first contact point and the hall sensor becomes a second contact point. For example, in the case in which two contact points are separated from each other (for example, when the user draws the display panel 110 from the body 120 to separate two contact points), the hall sensor generates the rotation start event to transfer to the controller 470. In the case in which the two points meet (for example, when the user shoves the display panel 110 into the body 120 to meet two contact points), the hall sensor may generate the rotation end event to transfer to the controller 470.

The controller 470 performs the functions for controlling an overall operation of the apparatus 400 and a flow of signals between inner configuration elements. The controller 470 controls a power supply supplied from a battery to the inner configuration elements. In addition, the controller 470 may include a Central Processing Unit (CPU) and a Graphic Processing Unit (GPU). In the CPU and GPU, two or more independent cores (e.g., a quad-core) may be integrated into a single package formed of a single integrated circuit. Further, the CPU and the GPU may be implemented as a System-on-Chip (SoC). Furthermore, the CPU and the GPU may be implemented with a multilayer packaging. A configuration including the CPU and the GPU may be referred to an Application Processor (AP).

The controller 470 detects an input of the rotation start event from the rotation start/end sensor 462 and may supply the power to the touch screen 410 in response to the rotation start event. In addition, the controller 470 may supply the power to the angle sensor 461. The controller 470 may detect an input of the rotation end event from the rotation start/end sensor 462 and may stop the supply of power to the touch screen 410 and the angle sensor 461 in response to the rotation end event. In a case in which a display off event is received from the key input unit 420 after receiving of the rotation start event from the rotation start/end sensor 462 (i.e., when stopping the display in a state in which the display panel 412 is unfolded), the controller 470 may maintain the supply of power to the angle sensor 461.

The controller 470 detects the input of the angle information (including the acceleration information) from the angle sensor 461 and then calculates an amount of rotation for each axis using the detected angle information. Here, the calculated amount of rotation may include a roll angle $\Phi$, a pitch angle $\theta$, and a yaw angle $\psi$. Referring to FIG. 1, the roll angle $\Phi$ indicates the amount of rotation based on the X axis, the pitch angle $\theta$ indicates the amount of rotation based on the Y axis, and the yaw angle $\psi$ indicates the amount of rotation based on the Z axis. Meanwhile, the controller 470 may calculate the amount of rotation using an algorithm such as a posture computation algorithm using an euler angle, a posture computation algorithm using an extended kalman filter, and an acceleration prediction switching algorithm. That is, the controller 470 of exemplary embodiments of the present invention may calculate the amount of rotation using various sensors and algorithms in addition to the acceleration sensor. The controller 470 may control the display panel 412 based on the calculated amount of rotation. Examples of the controlling of the flexible display panel will be described in more detail below.

In accordance with the trend toward convergence of digital devices, various modifications may be made to the exemplary embodiments described herein. The apparatus 400 of exemplary embodiments of the present invention further may include configurations such as a Global Positioning System (GPS) module, a vibration motor, and the like, which are not described above. In addition, in the apparatus 400 of exemplary embodiments of the present invention, a specific disclosed configuration may be excluded from the above configurations, or may also be replaced with another configuration as required.

Figure 5:
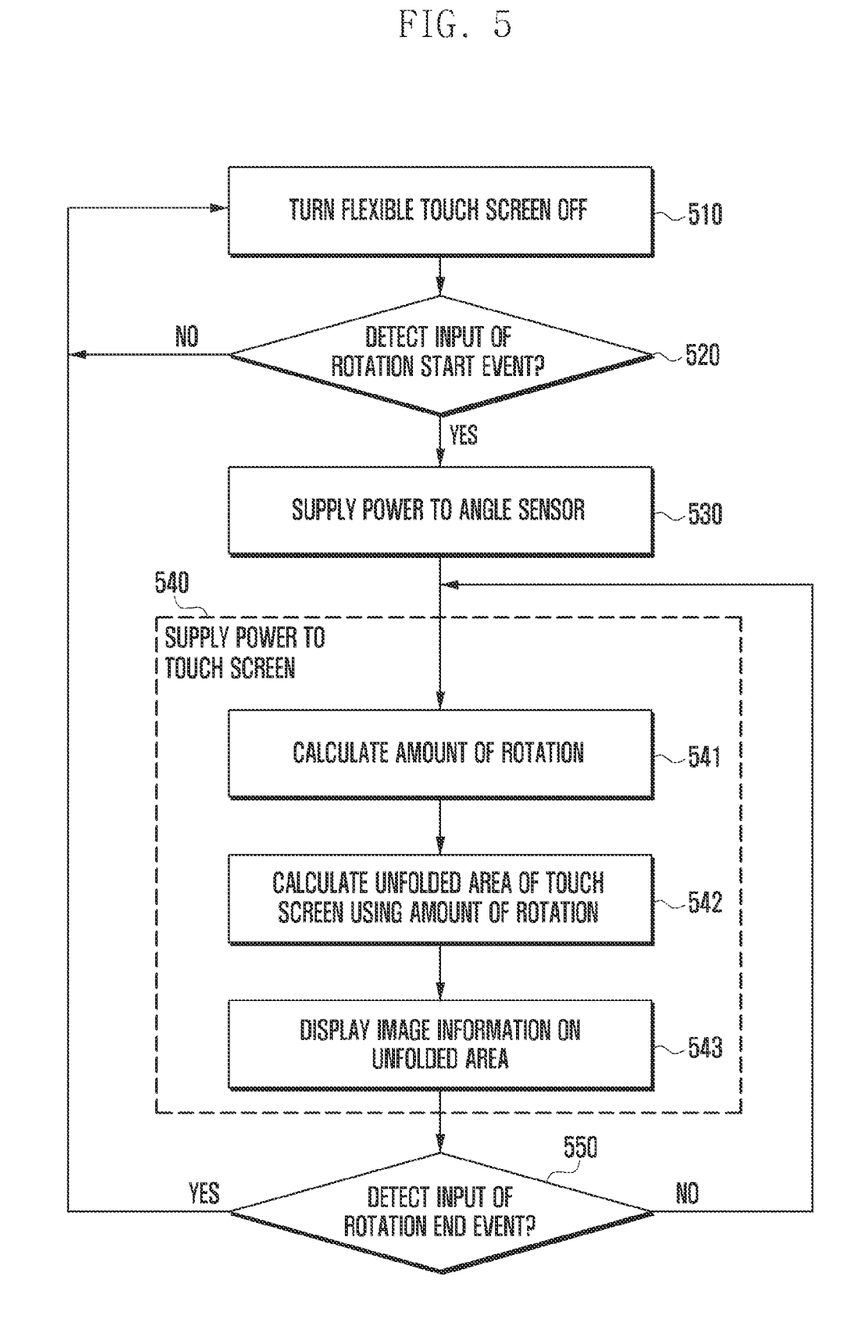
FIG. 5 is a flowchart illustrating a method for controlling a flexible display panel according to an exemplary embodiment of the present invention.

FIG. 5 is a flowchart illustrating a method for controlling a flexible display panel according to an exemplary embodiment of the present invention.

Referring to FIG. 5, the flexible touch screen 410 may be an off-state in step 510. That is, in step 510, the controller 470 may stop the supply of power to the flexible touch screen 410.

The controller 470 may detect an input of a rotation start event from a rotation start/end sensor 462 in step 520.

In the case in which the rotation start event is detected, the controller 470 supplies the power to the angle sensor 461 in step 530. Therefore, the angle sensor 461 detects the angle information (e.g., acceleration information) of the axis of rotation of the flexible display panel 412 to transfer the detected information to the controller 470.

The controller 470 may supply the power to the flexible touch screen 410 in step 540. More particularly, in step 540, the controller 470 controls the flexible touch screen 410 so that the image information is displayed only on the unfolded area in the entire display area. For example, the controller 470 receives the angle information (e.g., acceleration information) from the angle sensor 461 and then calculates the amount of rotation of the axis of rotation of the flexible touch screen 412 using the angle information in step 541. More specifically, the controller 470 calculates a first angle of the axis of rotation from a detection point t0 in which the rotation start event is detected. In addition, the controller 470 calculates the angle (e.g., pitch angle 450 degree) of the axis of rotation from a current point tnow. The controller 470 subtracts the first angle from the second angle to calculate the amount of rotation of the axis of rotation. For instance, in the case in which the angle of t0 is 90 degrees and the angle of tnow is 450 degrees, the amount of rotation of the axis of rotation is one rotation (360 degrees). The controller 470 calculates the unfolded area of the flexible touch screen 410 using the calculated amount of rotation in step 542. The controller 470 controls the flexible touch screen 410 so as to display the image information on the calculated unfolded area in step 543. For example, referring to FIG. 3A, the controller 470 may reduce a size of the picture 300 according to a width W of the first unfolded area 210, and may control the flexible touch screen 410 so that the reduced picture 300 is displayed on the first unfolded area 210. In addition, referring to FIG. 3B, the controller 470 may control the flexible touch screen 410 so as to display only a portion corresponding to the first unfolded area 210 in the picture 300 on the first unfolded area 210.

The controller 470 may detect an input of the rotation end event from the rotation start/end sensor 462. In a case in which the rotation end event is detected, the process may proceeds to step 510. Otherwise, the process may proceed to step 540 in step 550.

As described with reference to FIG. 5, the image information may be displayed only on the unfolded area of the flexible touch screen 410. More specifically, in a case in which the rotation start event is generated in the rotation start/end sensor 462 (e.g., as described with reference to FIGS. 1 and 4, the rotation start event is generated when the user draws the flexible display panel 110 from the body 120), the flexible touch screen 410 is turned on, and the image information is displayed only on the unfolded area thereof. In the case in which the rotation end event is generated in the rotation start/end sensor 462 (e.g., as described with reference to FIGS. 1 and 4, when the entire flexible display panel 110 is inserted into the body 120, the rotation end event is generated), the flexible touch screen 410 is turned off.

As described with reference to FIG. 5, in a case in which the angle sensor 461 is used for another function (e.g., for auto rotation of the screen), the angle sensor 461 may be continually activated regardless of the generation of the rotation end event.

Figure 6:
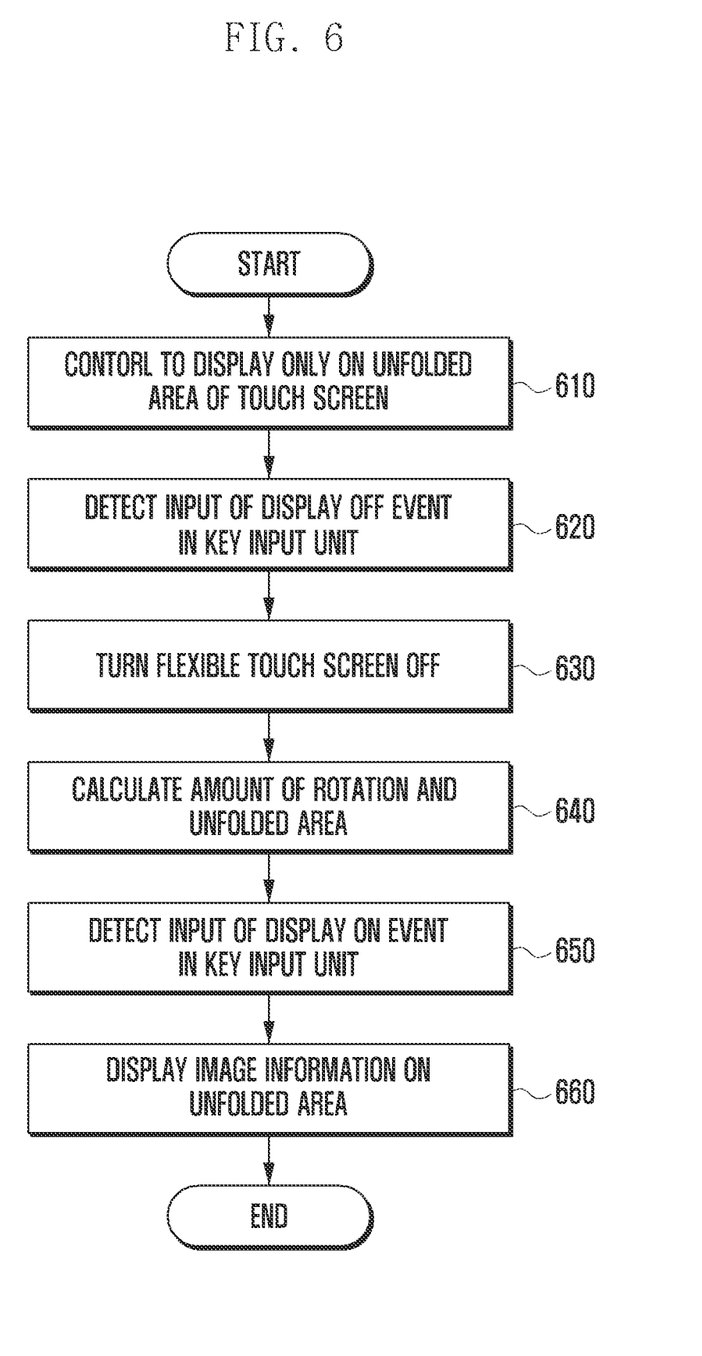
FIG. 6 is a flowchart illustrating a method for controlling a flexible display panel according to the exemplary embodiment of the present invention.

FIG. 6 is a flowchart illustrating a method for controlling a flexible display panel according to the exemplary embodiment of the present invention.

Referring to FIG. 6, the controller 470 controls to supply power to the flexible touch screen 410 so that the image information may be displayed only on the unfolded area of the flexible touch screen 410 in step 610. Step 610 is substantially the same as step 540.

The controller 470 may detect the input of the display off event in the key input unit 420 in step 620.

In the case in which the display off event is detected in the key input unit 420, the controller 470 turns the flexible touch screen 410 off in step 630. That is, the controller 470 stops the supply of power to the flexible touch screen 410. In this case, since the rotation off event is not generated, the controller 470 maintains the supply of power to the angle sensor 461 so as to continually detect the angle information of the axis of rotation of the flexible touch screen 410.

The controller 470 receives the angle information (e.g., acceleration information) from the angle sensor 461, calculates the amount of rotation of the axis of rotation of the flexible touch screen 412 using the angle information, and then calculates the unfolded area of the flexible touch screen 410 using the calculated amount of rotation in step 640.

The controller 470 may detect the input of the display on event in the key input unit 420 in step 650.

In the case in which the display on event is detected in the key input unit 420, the controller 470 controls the flexible touch screen 412 so that the image information is displayed on the unfolded area calculated in step 640 in step 660. Here, in the case in which the rotation end event is detected, the controller 470 may not react to the display on event input from the key input unit 420. Instead, since the angle sensor 461 needs not to be driven (i.e., since the rotation end event is generated), the controller 470 stops the supply of power to the angle sensor 461.

As described with reference to FIG. 6, the user may turn the flexible touch screen 410 off by operating the key input unit 420 in a state in which the flexible touch screen 410 is unfolded. After that, the user may turn the flexible touch screen 410 on by operating the key input unit 420. Here, the user may roll or may further unfold the flexible touch screen 410 before the flexible touch screen 410 is turned on. Then, the unfolded area before it is turned-on may differ from the unfolded area after it is turned on. That is, after the flexible touch screen 410 is turned on, the image information may be displayed only on the current unfolded area.

The foregoing method of the present invention may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, flash memory storing and executing program commands. Further, the program command includes a machine language code created by a compiler and a high-level language code executable by a computer using an interpreter. The foregoing hardware device may be configured to be operated as at least one software module to perform an operation of the present invention.

As set forth above, the method and the apparatus of the present invention can control to display the image information on the unfolded display area of the flexible display panel. Accordingly, the application of the flexible display panel may be improved. Further, the image information is not displayed on the folded area, such that the power consumption may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a flexible display panel of an apparatus having an axis of rotation, the flexible display panel having one end which is attached to the axis of rotation such that the flexible display panel is to be rolled to the axis of rotation and to be unrolled from the axis of rotation, the method comprising:
   calculating an amount of rotation of the axis of rotation;
   calculating an unfolded area of the flexible display panel by using the amount of rotation; and
   controlling the flexible display panel so as to display image information on the unfolded area.

2. The method of claim 1, further comprising:
   detecting a rotation start event of the axis of rotation from a rotation start/end sensor,
   wherein the calculating of the amount of rotation comprises starting to calculate the amount of rotation of the axis of rotation at a point in time when the rotation start event is detected.

3. The method of claim 2, further comprising:
   detecting a rotation end event of the axis of rotation from the rotation start/end sensor; and
   turning the flexible display panel off in response to the rotation end event.

4. The method of claim 2, where the calculating of the amount of rotation comprises:
   calculating a first angle of the axis of rotation at a point in time t0 when the rotation start event is detected;

calculating a second angle of the axis of rotation at a current point in time $t_{now}$; and calculating the amount of rotation of the axis of rotation by performing a subtraction using the first angle and the second angle.

5. The method of claim 1, wherein the calculated amount of the unfolded area of the flexible display corresponds to a calculated amount of rotation of the axis of rotation selected from among $2\pi r$, $4\pi r$ and $8\pi r$, and wherein r is the radius of the axis of rotation of the flexible display panel.

6. A non-transitory computer-readable storage medium storing one or more programs comprising instructions which, when executed by an electronic device, cause the device to execute the method according to claim 1.

7. The non-transitory computer-readable storage medium of claim 6, wherein the calculated amount of the unfolded area of the flexible display corresponds to a calculated amount of rotation of the axis of rotation selected from among $2\pi r$, $4\pi r$ and $8\pi r$, and wherein r is the radius of the axis of rotation of the flexible display panel.

8. An apparatus for controlling a flexible display panel, the apparatus comprising:

an axis of rotation;

a flexible display panel having one end which is attached to the axis of rotation to be rolled to the axis of rotation and to be unrolled from the axis a rotation;

an angle sensor for sensing an angle of the axis of rotation; and a controller configured to:

calculate an amount of rotation of the axis of rotation by using angle information received from the angle sensor, calculate an unfolded area in an entire display area of the flexible display panel by using the amount of rotation, and control the flexible display panel so as to display image information on the unfolded area.

9. The apparatus of claim 8, further comprising:

a rotation start/end sensor sensing start and end of the axis of rotation, wherein the controller starts to calculate an amount of rotation of the axis of rotation in a point of time when a rotation start event is detected.

10. The apparatus of claim 9, wherein the controller is further configured to:

calculate a first angle of the axis of rotation in a point of time t0 when the rotation start event is detected, calculate a second angle of the axis of rotation in a current point of time $t_{now}$ and calculate the amount of rotation of the axis of rotation by performing a subtraction for the first angle and the second angle.

11. The apparatus of claim 10, further comprising a flexible touch panel seated on the flexible display panel.

12. The apparatus of claim 9, wherein the controller is further configured to turn the flexible display panel off when a rotation end event is detected from the rotation start/end sensor.

13. The apparatus of claim 8, wherein the calculated amount of the unfolded area of the flexible display corresponds to a calculated amount of rotation of the axis of rotation selected from among $2\pi r$, $4\pi r$ and $8\pi r$, and wherein r is the radius of the axis of rotation of the flexible display panel.

14. The apparatus of claim 8, wherein the angle sensor comprises an acceleration sensor.

* * * * *